United States Patent [19]

Cockett et al.

[11] Patent Number: 5,256,300
[45] Date of Patent: Oct. 26, 1993

[54] ABSORPTION OF MATERIALS

[75] Inventors: Keith R. F. Cockett, Warrington; Martin Concannon, West Kirby; Maurice Webb, Chester, all of Great Britain

[73] Assignee: Unilever Patent Holdings B.V., Vlaardingen, Netherlands

[21] Appl. No.: 971,644

[22] Filed: Nov. 5, 1992

[30] Foreign Application Priority Data

Nov. 5, 1991 [EP] European Pat. Off. ........ 91310191.1

[51] Int. Cl.⁵ ............................................. C02F 1/28
[52] U.S. Cl. ................................. 210/691; 210/908; 210/909; 210/690
[58] Field of Search ............... 210/690, 691, 908, 902, 210/909

[56] References Cited

U.S. PATENT DOCUMENTS

| | | | |
|---|---|---|---|
| 4,264,373 | 4/1981 | Shinbori et al. | 210/670 |
| 4,458,030 | 7/1984 | Manabe et al. | 502/183 |
| 4,752,397 | 6/1988 | Sood | 210/670 |
| 4,867,882 | 9/1989 | O'Neill et al. | 210/684 |
| 5,055,199 | 8/1991 | O'Neill et al. | 210/684 |

FOREIGN PATENT DOCUMENTS 58-214338 12/1983 Japan .

OTHER PUBLICATIONS

Pavkov et al., "Isolation of Some Organophosphorus Insecticides from Water by Adsorption. Adsorption of Some Organophosphorus Insecticides from Water by Talc and Activated Carbon", *Chemical Abstracts*, vol. 93, No. 3, p. 238.

Primary Examiner—Stanley S. Silverman
Assistant Examiner—Cynthia L. Nessler
Attorney, Agent, or Firm—Cushman, Darby & Cushman

[57] ABSTRACT

The removal of organo-toxins from aqueous sources can be achieved efficiently by contacting the water source with hydrotalcite-like materials. The toxins include organo-chlorines, insect resist agents, and wool treatment byproducts.

2 Claims, 1 Drawing Sheet

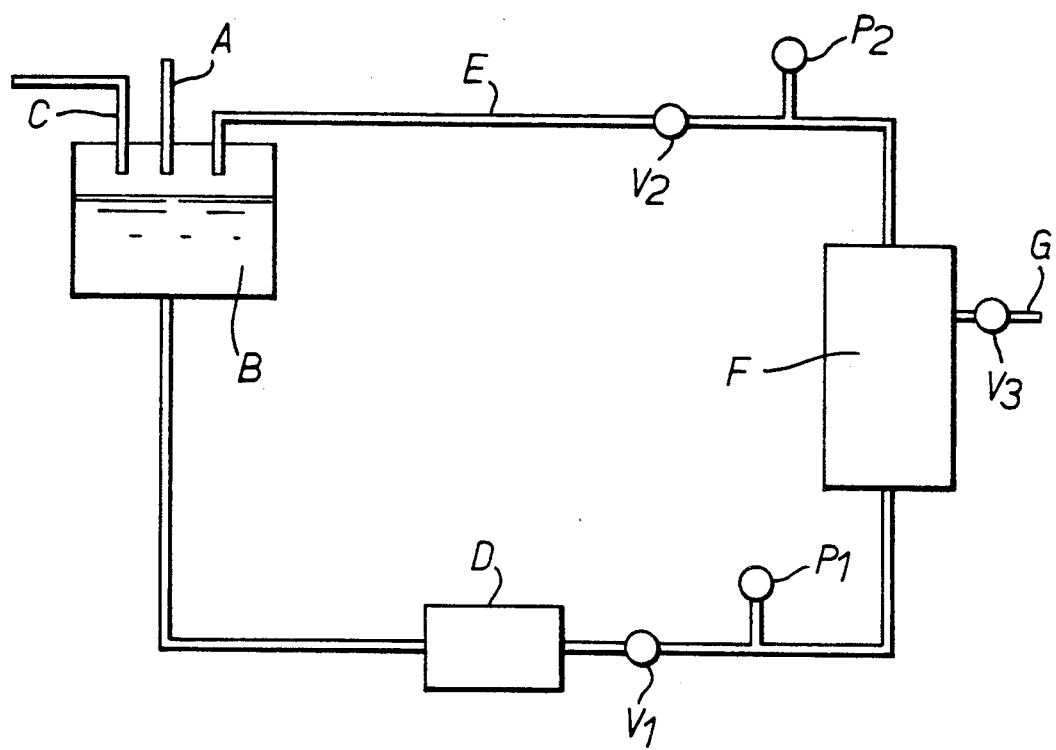

ABSORPTION OF MATERIALS

FIELD OF THE INVENTION

This invention relates to the removal of organo-toxins from water. These organo-toxins, examples being pesticides, herbicides, and organo-halogens, are found in a variety of water sources. These can be naturally occurring, as obtained from agricultural wash-off, or be products of industrial processes, e.g. textile treatments. There is a general requirement to remove these organo-toxins from these water sources in an efficient manner.

BACKGROUND TO THE INVENTION

Organo-toxins are used in a variety of industrial and agricultural procedures and usually come to be present in water sources. These may be industrial effluents or agricultural drainage run-off. Examples of these uses of organo-toxins are i) in raw-wool scouring where organo-chlorines and organo-phosphates act as pesticides and herbicides. These include sheep-dip pesticides, which are deliberately applied to the fleece, and agricultural pesticides which are picked up by the fleece when contacting treated vegetation, ii) insect resist agents, i.e. mothproofers. These pesticides have some substantivity for textile fibres and have biocidal action against household moth larvae, iii) absorbable organo-halogens are produced during shrink-resist treatment of wool, when the wool is treated with chlorine, and comprise highly chlorinated protein fragments, There is thus a clear need for means of removing these organo-toxins from water.

GENERAL DESCRIPTION OF THE INVENTION

This invention proposes the use of hydrotalcite-like materials to absorb organo-toxins from water. These materials are highly effective absorbents which can remove organo-toxins from water even at relatively low concentrations. Usually these organo-toxins will be present at a level of a few ppb (parts per billion) to several thousand ppm (parts per million) in the water dependent on sources and the hydrotalcite-like material is added at a level of 0.001% wt to 1.0% wt on the water. By this means the organo-toxins are not only removed from the water but concentrated. They are then in a form which can be destroyed by heating, chemical action or biological processing. Thus the use of hydrotalcite-like material provides a cost effective route to removing organo-toxins from water. If another system is used to remove the organo-toxins in part, then hydrotalcite-like materials can be used to reduce the concentration in a final stage.

The means of contacting the water with the absorbent will be selected to be appropriate for the organo-toxin and the industrial processes involved. Examples of contact methods are filter beds (using the absorbent alone or with filter aids such as sand), cartridges and stirred tanks with associated filter means.

Thus, the present invention utilises anion exchange materials related to a compound of the formula $Mg_6Al_2(OH)_{16}CO_3.4H_2O$ known as hydrotalcite, and for convenience referred to hereinafter as hydrotalcite-like materials. The calcined materials are included.

The hydrotalcite-like materials useful in this invention can be described by formula I below:

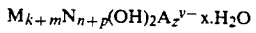

where:
M is any 1+ or 2+ cation or combination thereof
N is any 3+ or 4+ cation or combination thereof
k is the sum of the individual mole fractions of the 1+ cations
m is the sum of the individual mole fractions of the 2+ cations
n is the sum of the individual mole fractions of the 3+ cations
p is the sum of the individual mole fractions of the 4+ cations where either but not both of k and m or n and p can be zero and $k+m+n+p=1$.
$A_z{}^{y-}$ is any anion of charge $y-$ and mole fraction z, or combination of anions of similar or differing $y-$ and $K+2m+3n+4p-2-zy=0$ and x can range from 1 to 100.

Examples of the cations M in the above formula are $Li^{30}$, $Mg^{2+}$, $Zn^{2+}$, $Fe^{2+}$, $Cu^{2+}$, $Sn^{2+}$, $Ca^{2+}$ and $Sr^{2+}$. Suitable N cations include $Al^{3+}$, $Fe^{3+}$, $Ti^{4+}$ and $Sn^{4+}$.

Preferred divalent cations are $Zn^{2+}$, $Cu^{2+}$ or $Mg^{2+}$ or a combination of these ions, or a combination with other divalent cations.

The anion A may be an inorganic or organic anion. Preferred inorganic anions A are $Cl^{31}$, $NO_3{}^-$, $SO_4{}^{2-}$, $CO_3{}^{2-}$ and $OH^-$. Examples of organic anions are carboxylate ions such as citrate and stearate.

Examples of hydrotalcite-like materials of this invention are:

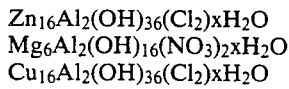

Preparation of hydrotalcite-like compounds is known and had been described in a number of publications including Solid State Ionics 22 (1986) pages 135–141 where there is published a paper by Walter T Reichle entitled "Synthesis of Anionic Clay Minerals (Mixed Metal Hydroxides, Hydrotalcite)" and Chemtech (January 1986) pages 58–63 where there is published a paper by Walter T Reichle entitled "Anionic Clay Minerals".

The applicants have found hydrotalcite-like materials of grain size less than 110 Å can absorb at a faster rate than materials with a grain size greater than 110 Å. These finer grain size materials also have a greater absorbant capacity. Preferably the grain size is less than 100 Å, more preferably between 40 and 100 Å. These grain sizes are measured in the <001> direction by X-ray diffraction.

It is therefore a first object of the present invention to use an hydrotalcite-like materials described by formula below:

where:
M is any 1+ or 2+ cation or combination thereof
N is any 3+ or 4+ cation or combination thereof
k is the sum of the individual mole fractions of the 1+ cations
m is the sum of the individual mole fractions of the 2+ cations
n is the sum of the individual mole fractions of the 3+ cations
p is the sum of the individual mole fractions of the 4+ cations where either but not both of k and m or n and p can be zero and $k+m+n+p=1$.

$A_z^{y-}$ is any anion of charge y− and mole fraction z, or combination of anions of similar or differing y− and K+2m+3n+4p−2−zy=0 and x can range from 1 to 100.

to absorb organo-toxins from water wherein the organo-toxins include pesticides, herbicides, insect resist agents, and organo-halogens.

It is a second object of the present invention to provide a process for absorbing organo-toxins from water, the organo-toxins including pesticides, herbicides, insect resist agents, and organo-halogens, wherein an hydrotalcite-like material described by formula below:

$$M_{k+m}N_{n+p}(OH)_2A_z^{y-} \cdot xH_2O$$

where:
M is any 1+ or 2+ cation or combination thereof
N is any 3+ or 4+ cation or combination thereof
k is the sum of the individual mole fractions of the 1+ cations
m is the sum of the individual mole fractions of the 2+ cations
n is the sum of the individual mole fractions of the 3+ cations
p is the sum of the individual mole fractions of the 4+ cations where either but not both of k and m or n and p can be zero and k+m+n+p=1.
$A_z^{y-}$ is any anion of charge y− and mole fraction z, or combination of anions of similar or differing y− and K+2m+3n+4p−2−zy=0 and x can range from 1 to 100.

is contacted with water containing organo-toxins to form a slurry, said hydrotalcite-like material absorbing said organo-toxins, the hydrotalcite-like material being then removed from the slurry.

A. Zinc/aluminium hydrotalcite-like material

A zinc/aluminium hydrotalcite-like material useful in the present invention may be prepared in one of the following ways or in other ways known in the art:

1. A 1 mol dm$^{-3}$ solution of an 8:1 molar ration of zinc chloride and aluminium chloride was prepared. To this a 2 mol dm$^{-3}$ solution of sodium hydroxide was added until the original pH of the chloride solution had been increased from around 3 to pH 6.75. This resulted in the formation of a white gel-like precipitate which was separated by centrifuging. The precipitate was then washed by suspension in demineralised water followed by centrifuging. This washing process was repeated several times. The gel was then dried at 80° C. to 100° C. and ground to a fine powder.

2. A 1 mol dm$^{-3}$ solution of an 8:1 molar ratio of zinc chloride and aluminium chloride was prepared and simultaneously pumped into a 5 liter beaker, fitted with a stirrer, along with a 5 mol dm$^{-3}$ solution of sodium hydroxide. The rate of addition of sodium hydroxide was varied to maintain a pH of 6.5 in the reaction mixture. The resulting gel was separated and washed as described above. Particles of the washed precipitate were then dried in different ways:
   a) spray dried;
   b) slurried in alcohol, filtered and oven dried at 50+ C. The resulting precipitate was then hammer milled to form a finer powder;
   c) slurried in nonionic surfactant (Synperonic A7 ex ICI) filtered and oven dried at 50° C. The resulting precipitate was then hammer milled to form a fine powder.

B. Magnesium/aluminium hydrotalcite-like materials

A magnesium/aluminium hydrotalcite-like material useful in the present invention may be prepared in the following way or in other ways known in the art.

To 98 liters of water 19.5 kg of sodium hydroxide was added followed by 25 kg of magnesium nitrate and 18.3 kg of aluminium nitrate dissolved in 73 liters of water to give a Mg:Al ratio of 3:1. The nitrate solution was added over a period of 30 minutes with stirring. The solution was heated at 90° C. to 100° C. for 2 hours. The resulting precipitate was filtered and washed. The precipitate was treated as follows:

(i) a sample was resuspended in water to give a 10% solids slurry;
(ii) a sample was spray dried; and
(iii) a sample was oven dried at approximately 120° C. and micronised using a fluid energy mill.

C. Mg/Al hydrotalcite-like material of small grain size

A magnesium/aluminium hydrotalcite-like material of finer grain size useful in the present invention is prepared as follows:

An alkali solution comprising 150 liters of a mixed sodium hydroxide/sodium carbonate alkali solution and having a total anion concentration of 5M and a hydroxide to carbonate molar ratio of 3:1, was added to a vessel containing around 66 liters of demineralised water to raise the pH from neutral to around pH 10.

A solution of aluminium sulphate and magnesium sulphate having a total metal ion concentration of 2M and a magnesium to aluminium molar ratio of 3:1, was added to the vessel and the vessel contents were agitated. The rate of addition of the sulphate solution was adjusted to maintain a pH in the solution of 10 to 10.5. Immediate precipitation occurred on addition of the sulphate solution however the resulting slurry was cooled to maintain a temperature of 25° C. The reaction time was approximate 50 minutes, plus 10 minutes agitation once addition of the solutions was complete. The slurry was then pressed to form a filter cake and the cake was washed with demineralised water. The wash filtrate was tested for the presence of sulphate anions using barium chloride solution, which indicated that most of the sulphate had been removed from the cake. The cake was then air dried for 1 hour and then passed through a ring drier and then milled in a fluid energy mill to a particle size of 5 to 7 microns.

The grain size of this material was measured by X-ray powder diffraction using a Philips series 17 diffractometer and Cuk α radiation. The (001 reflection peak was converted into full-width-at-half-maximum values using either $$FWHM_L = \frac{2.00}{B} \text{ or } FWHM_{SQL} = \frac{1.29}{B}$$

by measuring the breadth (B) and fitting these to either lorentzian or squared-lorentzian profiles. The peak position and FWHM values are inserted into the Scherrer equation described in EF Kaelbu, Handbook of X-rays, McGraw-Hill, (1967) from which the grain size can be calculated. The grain size was found to be 53 Å.

It has been found that the morphology of hydrotalcite-like materials is dependent on their method of preparation. Especially preferred are methods of preparation which give rise to porous materials such as spray drying.

BRIEF DESCRIPTION OF THE DRAWINGS

FIG. 1 is a schematic drawing of a simple plant used to run the invention on an industrial scale.

SPECIFIC DESCRIPTION OF THE INVENTION

Examples of the use of hydrotalcite-like materials (HT) as absorbents will now be given to illustrate the invention with reference to FIG. 1.

EXAMPLE I

Pesticides were removed from raw wool scouring effluent. A sample of Mg/Al HT prepared using method C described previously was used to remove organo-chlorines (OC) and organo-phosphates (OP). Samples of effluent water were collected after acid cracking and tank neutralisation together with samples of ultra-filtration permeate. The sample was analysed for pesticide content before and after HT treatment. Latter was performed at a boiling temperature at a level of 1.0% wt and in a stirred beaker and then filtered. Results are given in Table IA. These show the levels of OC and OP were effectively reduced.

TABLE I

| | all concentrations in ppb. | | | |
|---|---|---|---|---|
| | Before treatment | | After treatment | |
| | Totals OC | Total OP | Total OC | Total OP |
| Effluent 1 (ultrafiltration permeate) | BDL | 57 | BDL | BDL |
| Effluent 2 (acid cracking) | 3 | 84 | 4 | BDL |
| Effluent 3 (acid cracking + neutralisation) | 11 | BDL | BDL | BDL |

BDL = below detection limit of equipment.

Ultrafiltration and acid cracking (with or without neutralisation) are standard methods for reducing the very high Chemical Oxygen Demand of wool scour liquors. Neither method reduces the levels of pesticides in the effluent.

In Table IB are shown the results from adding small amounts of Lindane (an OC), Propetamphos and Diazinon (both OP) to the ultrafiltration permeate. All samples were treated with HT at the boil for 10 minutes.

TABLE IB

| | | Total OC (ppb) | Total OP (ppb) |
|---|---|---|---|
| i. | Untreated permeate | 1.48 | 76.7 |
| | After treatment with 0.5% by wt HT | BDL | 4.70 |
| ii. | Untreated permeate with added pesticide | 82 | 1496.2 |
| | After treatment with 0.1% by wt HT | BDL | BDL |

EXAMPLE II

Insect resist (IR) agent residues were removed from spent dye liquors using HT. The absorbent was prepared using method C described previously.

Spent dyebath liquors containing residual amounts of IR agents Sulcofuron (A), Flucofuron (B) and Permethrin (C) were treated with HT.

Treatment was performed at a HT level of 1.0% wt at a temperature of 100° C. for 30 minutes. The HT was removed by filtration and the IR agent concentration measured and compared to that in the original control solution. The results are given in Table II.

TABLE II

| | Conc (mg/l) | | |
|---|---|---|---|
| Sample | Control | after treatment | % removed |
| A | 7.53 | 4.52 | 40.0 |
| B | 18.25 | 0.14 | 99.2 |
| Ci) | 0.992 | 0.103 | 89.6 |
| Cii) | 0.456 | 0.082 | 82.0 |
| Ciii) | 0.664 | <0.020 | >95.5 |

EXAMPLE III

Absorbable organo-halogens (AOX) were removed by treatment with HT. The absorbent was prepared using method C described previously.

Exhausted wool treatment liquors containing shrink-resist (SR) materials were treated with HT. In shrink-resist treatment the wool is contacted with chlorine and then neutralised. The effluent from these baths is the pretreatment effluent. Subsequently the wool is treated in resin and softener baths. AOX can be removed from these effluents by HT. In one series of experiments (Table III) exhausted pretreatment liquor was treated at a level of 10 g/l at 100° C. for 10 minutes. In the second series (Table IV) the level of HT was increased from 2 to 10 g/l at temperatures of 20° C. and 40° C. for 10 minutes and the pretreatment liquor subjected to HT treatment.

In all cases a significant reduction of absorbable organo-halogen was achieved.

TABLE III

| | AOX ppm | |
|---|---|---|
| | Before treatment | After treatment |
| Pretreatment liquor | 24.6 | 10.6 |
| Resin/softener liquor | 6.7 | 1.1 |
| Combined effluent | 32.0 | 15.2 |

TABLE IV

| Pretreatment liquor only. | |
|---|---|
| | AOX ppm |
| Untreated liquor | 42.72 |
| After treatment with: | |
| 0.2% HT at 20° C. | 29.58 |
| 0.4% HT at 20° C. | 29.76 |
| 0.6% HT at 20° C. | 26.22 |
| 0.8% HT at 20° C. | 21.90 |
| 1.0% HT at 20° C. | 17.62 |
| 0.2% HT at 40° C. | 33.36 |
| 0.4% HT at 40° C. | 19.28 |
| 0.6% HT at 40° C. | 18.20 |
| 0.8% HT at 40° C. | 16.50 |
| 1.0% HT at 40° C. | 14.20 |

Thus the removal of AOX increases at higher HT concentrations and higher temperatures.

EXAMPLE IV

Industrial scale tests were done to prove the removal of the mothproofing agent Permethrin from the spent liquors obtained during carpet yarn production. The liquors were treated in a plant as disclosed in FIG. 1.

As illustrated in FIG. 1, hydrotalcite, prepared using method C previously described, is introduced, either as a powder or as the powder slurried in water, via tube A into the reaction vessel, B. A contaminated effluent is introduced to the reaction vessel via tube C, where it reacts with the hydrotalcite thus removing the contaminants from solution and absorbing them on the surface of the hydrotalcite particles.

The slurry of hydrotalcite and treated effluent flows from the reaction vessel to the pump D. From the pump the slurry passes through valve $V_1$ and up the centre of a bundle F of tubular PTFE semi-permeable membranes. The pore size of the PTFE membranes was 1 micron. The membranes are fixed in a vertical direction and the slurry is pumped in an upwards direction. From the top of the membranes the slurry is returned to the reaction vessel B via the valve $V_2$ and tube E.

The returning slurry stream provides sufficient agitation to the reaction vessel to ensure intimate mixing of the hydrotalcite and contaminated effluent. No mechanical mixing is required.

By controlling the positions of values $V_1$ and $V_2$ a pressure difference, as measured on the pressure gauges $P_1$ and $P_2$, can be established between the top and bottom of the bundle of tubular membranes. This pressure difference sets up a pressure drop across the membranes such that water is forced through the pores in the membrane. The particles of hydrotalcite are too large to pass through the pores and are thus retained inside the membrane tubes. The water passing through the membranes is known as permeate and can be removed from the filter via valve $V_3$ along tube G.

The rate at which permeate is removed from the system is very low compared to the rate at which the pump passes slurry up the membrane tubes. For every 1 liter of slurry exiting the pump >95% is returned to the reaction vessel. Less than 5% is removed as clean permeate. This very high ratio ensures a high velocity of hydrotalcite particles across the membrane surface and so prevents fouling of that membrane.

As clean permeate is drawn off via tube G, the level of liquid in the reaction vessel drops. If fresh untreated effluent is added via tube C at the same rate as permeate is removed from the system, a constant level of liquid, and therefore a constant residence time, is maintained in the reaction vessel. The system will produce clean permeate until the hydrotalcite becomes exhausted at which point the filter can be stopped, emptied of slurry, refilled with water and fresh hydrotalcite and restarted.

The following tests were organised to demonstrate the ability of HT to remove the mothproofer Permethrin from the spent dyebaths originating from the hank dyeing of 80/20 wool/nylon carpet yarn.

A similar experimental method was adopted for all 3 trials, only the amount of hydrotalcite dosed to the reaction tank varies. The procedure was as follows:
  i) The reaction vessel was charged with ca. 10–12 liters of spent dyebath effluent.
  ii) A known amount of hydrotalcite was added to the reaction vessel an the hydrotalcite effluent slurry circulated through the filters for 5 minutes. At this stage no permeate was removed from the system. This 5 minutes mixing time allows good dispersion of the hydrotalcite in the effluent.
  iii) The permeate value $V_3$ was then opened and permeate removed from the system at a rate of 150 ml per min. As the level of liquor in the reaction vessel dropped fresh spent dyebath liquor was added via C.
  iv) At timed intervals permeate samples were collected and sent for analysis. A sample of the spent dyebath liquor untreated by hydrotalcite was also sent for analysis.

| Trial 1 | |
|---|---|
| Dyebath Volume | 2200 liters |
| Weight of Wool Dyed | 82 kg |
| Mothproofer | 10% active solution of Permethrin added at 0.04% owf (on weight of fibre) |
| 60 g of hydrotalcite added to reaction tank | |

| Sample Description | Permethrin μg/liter |
|---|---|
| Untreated Spent Dye Liquor | 676.4 |
| After 12 minutes of permeate flow | 23.7 |
| After 32 minutes of permeate flow | 15.1 |
| After 74 minutes of permeate flow | 11.3 |
| After 132 minutes of permeate flow | 4.5 |
| After 206 minutes of permeate flow | n.d. | n.d. = no Permethrin detected

These results show a sharp initial decrease in Permethrin levels followed by a much slower (almost asymptotic) decline to a level below the instrumental detection limit. However, it should be remembered that these results are not from a single volume of effluent. The initial charge of 10 liters of effluent to the reaction tank of the filter placed $10 \times 676.4$ μg of Permethrin into the filter system, i.e. 6.8 mg. During the next $3\frac{1}{2}$ hours a further 16.2 mg ($24 \times 676.4$ μg) of Permethrin was added to that reaction tank. The total amount of mothproofing agent removed by the 60 g dose of hydrotalcite was therefore 23 mg.

| Trial 2 | |
|---|---|
| Dyebath Volume | 4800 liters |
| Weight of Wool Dyed | 160 kg |
| Mothproofer | 10% active solution of Permethrin added at 0.08% owf (on weight of fibre) |
| 20 g of hydrotalcite added to reaction tank | |

| Sample Description | Permethrin μg/liter |
|---|---|
| Untreated Spent Dye Liquor | 40.0 |
| After 5 minutes of permeate flow | <0.8 |
| After 20 minutes of permeate flow | n.d. | n.d. = no Permethrin detected

These results again show a significant and steady decrease in Permethrin levels with time even through fresh quantities of spent dyebath liquor were being continuously added to the reaction tank of the filer system. In total, the 20 g of hydrotalcite removed some 76 μg of Permethrin during the 20-minute period of the experiment.

| Trial 3 | |
|---|---|
| Dyebath Volume | 19800 liters |
| Weight of Wool Dyed | 1162 kg |
| Mothproofer | 10% active solution of Permethrin added at 0.08% owf (on weight of fibre) |
| 40 g of hydrotalcite added to reaction tank | |

| Sample Description | Permethrin μg/liter |
|---|---|
| Untreated Spent Dye Liquor | 96.9 |
| After 12 minutes of permeate flow | 17.3 |
| After 37 minutes of permeate flow | 0.8 |
| After 79 minutes of permeate flow | n.d. |
| After 119 minutes of permeate flow | n.d. |
| After 167 minutes of permeate flow | n.d. |

| | |
|---|---|
| -continued | |
| After 235 minutes of permeate flow | n.d. | n.d. = no Permethrin detected

As observed for the two trials above, a sharp initial decrease in Permethrin levels is noted, followed by a slower decline to a level below the instrument's detection limit. In common with the above trials, fresh quantities of spent dyebath effluent were continuously being added to the system. The initial charge of effluent to the reaction tank placed $12\times96.9$ μg, i.e. 1.16 mg of Permethrin in the filter system. During a period of approx. 4 hours, 22 liters of dye liquor containing 2.13 mg ($22\times96.4$ μg) of Permethrin in total, were added to the reaction tank. The total amount of mothproofer removed by the 40 g dose of hydrotalcite was therefore 3.3 mg.

We claim:

1. A process for removing organo-toxins from water containing the same which comprises contacting the water with a hydrotalcite-like material described by formula below:

$$M_{k+m}N_{n+p}(OH)_2A_z{}^{y-}\cdot xH_2O$$

wherein:

M is any 1+ or 2+ cation or combination thereof

N is any 3+ or 4+ cation or combination thereof k is the sum of the individual mole fractions of the 1+ cations m is the sum of the individual mole fractions of the 2+ cations n is the sum of the individual mole fractions of the 3+ cations p is the sum of the individual mole fractions of the 4+ cations where either but not both of k and m or n and p can be zero and $k+m+n+p=1$.

$A_z{}^{y-}$ is any anion of charge $y-$ and mole fraction z, or combination of anions of similar or differing $y-$ and $k+2m+3n+4p-2-zy=0$ and x can range from 1 to 100;

to absorb organo-toxins from the water wherein the organo-toxins are selected from the group consisting of pesticides, herbicides, insect resist agents, and organo-halogens.

2. Process for absorbing organo-toxins from water, the organo-toxins being selected from the group consisting of pesticides, herbicides, insect resist agents, and organo-halogens, wherein an hydrotalcite-like material described by formula below:

$$M_{k+m}N_{n+p}(OH)_2A_z{}^{y-}\cdot xH_2O$$

where:

M is any 1+ or 2+ cation or combination thereof

N is any 3+ or 4+ cation or combination thereof k is the sum of the individual mole fractions of the 1+ cations m is the sum of the individual mole fractions of the 2+ cations n is the sum of the individual mole fractions of the 3+ cations p is the sum of the individual mole fractions of the 4+ cations where either but not both of k and m or n and p can be zero and $K+m+n+p=1$;

$A_z{}^{y-}$ is any anion of charge $y-$ and mole fraction z, or combination of anions of similar or differing $y-$ and $K+2m+3n+4p-2-zy=0$ and x can range from 1 to 100;

is contacted with water containing organo-toxins to form a slurry, said hydrotalcite-like material absorbing said organo-toxins, the hydrotalcite-like material being then removed from the slurry.

* * * * *